United States Patent
Gentile, Jr.

(10) Patent No.: US 6,322,273 B1
(45) Date of Patent: Nov. 27, 2001

(54) JOINT RESTRAINT ASSEMBLY

(75) Inventor: Zachary J. Gentile, Jr., Trussville, AL (US)

(73) Assignee: The Ford Meter Box Company, Inc., Wabash, IN (US)

( * ) Notice: Subject to any disclaimer, the term of this patent is extended or adjusted under 35 U.S.C. 154(b) by 0 days.

(21) Appl. No.: 09/415,685

(22) Filed: Oct. 8, 1999

(51) Int. Cl.$^7$ .............................. F16D 9/06; F16L 19/00; F16L 21/00
(52) U.S. Cl. .............................. 403/2; 403/362; 411/412; 285/404; 285/337
(58) Field of Search .............................. 403/374.1, 374.3, 403/374.4, 365, 366, 367, 373, 381; 285/414, 415, 404; 248/519, 527, 188.8; 411/412, 413

(56) References Cited

U.S. PATENT DOCUMENTS

| | | | |
|---|---|---|---|
| 817,300 | * 4/1906 | David | 285/414 |
| 1,185,745 | * 6/1916 | Weismiller | 411/412 |
| 1,384,045 | * 7/1921 | Burns | 285/404 |
| 1,487,682 | * 3/1924 | Leppert | 411/999 |
| 2,877,681 | * 3/1959 | Brown | 411/393 |
| 2,929,474 | * 3/1960 | Boardman | 411/413 |
| 4,092,036 | 5/1978 | Sato et al. . | |
| 4,397,485 | 8/1983 | Wood . | |
| 4,848,808 | 7/1989 | Pannell et al. . | |
| 4,896,903 | 1/1990 | Shumard . | |
| 4,940,259 | 7/1990 | Williams . | |
| 5,071,175 | 12/1991 | Kennedy, Jr. . | |
| 5,224,741 | 7/1993 | Burkit et al. . | |
| 5,288,108 | 2/1994 | Eskew et al. . | |
| 5,441,082 | 8/1995 | Eskew et al. . | |
| 5,544,922 | 8/1996 | Shumard et al. . | |
| 5,772,252 | 6/1998 | Malani . | |

FOREIGN PATENT DOCUMENTS

898026 * 6/1962 (GB) .

OTHER PUBLICATIONS

Brochure—Sigma/Nappco, SuperLug™, Pipe Restraints for Ductile Iron Pipe.
Brochure—Stargrip®, Star® Pipe, Mechanical Joint Restraint System for Ductile Iron Pipe.
Brochure—EBAA Iron Sales, Inc., Series 3000 Multi–Purpose Wedge Action Restraint.
Brochure—EBAA Iron Sales, Inc., Series 2000PV, Megalug Retainer Glands for PVC Pipe with Cast–Iron or I.P.S. Outside Diameters with M.J. Bells.
Brochure—The Ford Meter Box Co., Inc., Uni–Flange®, Series 1500 "Circle–Lock"™ For PVC Pipe.

* cited by examiner

*Primary Examiner*—B. Dayoan
*Assistant Examiner*—Ernesto Garcia
(74) *Attorney, Agent, or Firm*—Barnes & Thornburg

(57) ABSTRACT

Joint restraint assembly for connecting pipes which includes a substantially annular body, at least one segment, and at least one bolt. The annular body is configured to fit around a pipe and has at least one pocket formed adjacent the pipe and at least one bore disposed through the body into the pocket. The segment is configured to fit in the pocket. The bolt extends through the bore engaging the segment abutting same against the pipe. In addition, the bolt has a stop ring formed thereon limiting the length the bolt can extend through the bore to a defined length sufficient for retaining the annular body around the pipe.

8 Claims, 10 Drawing Sheets

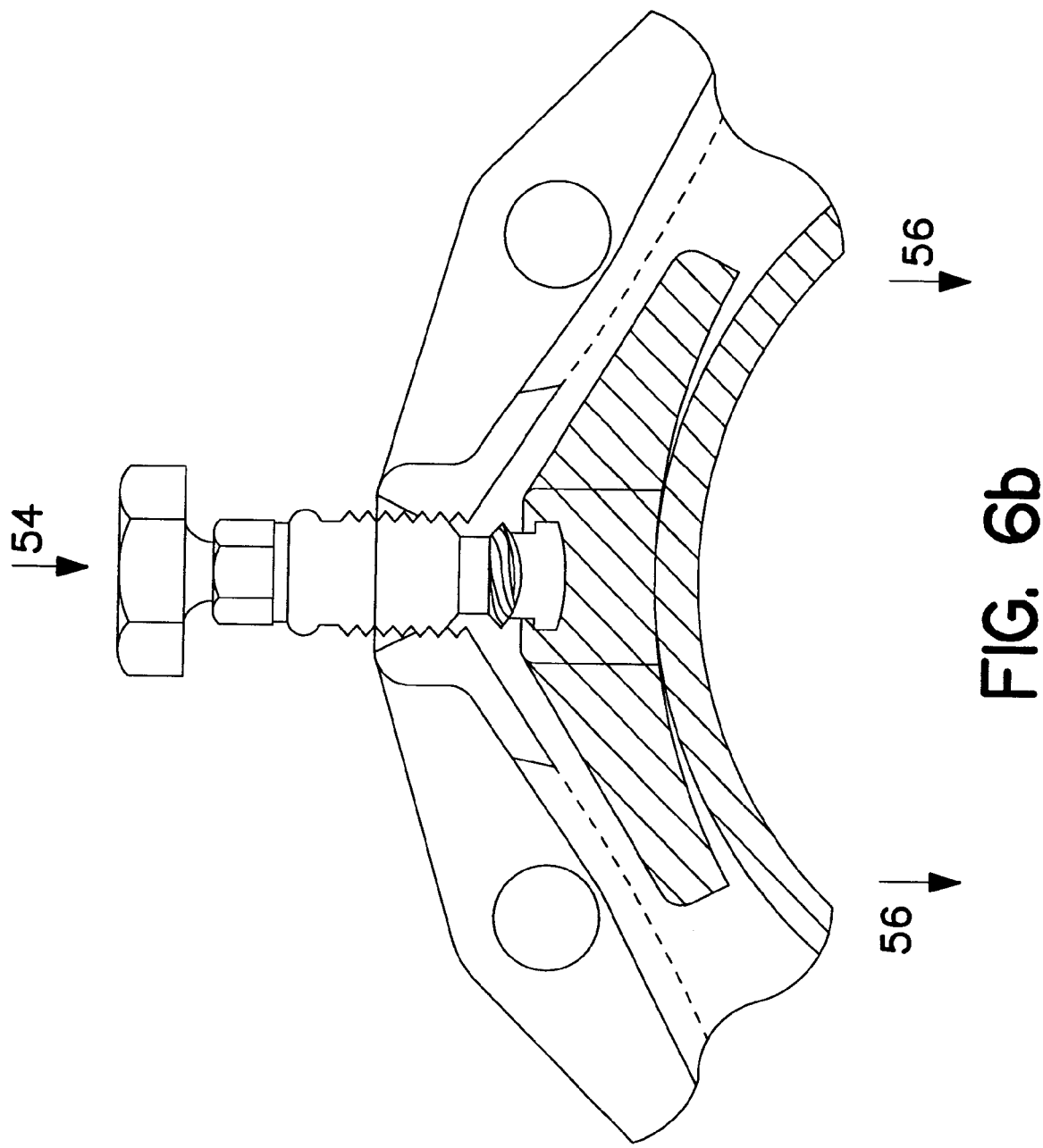

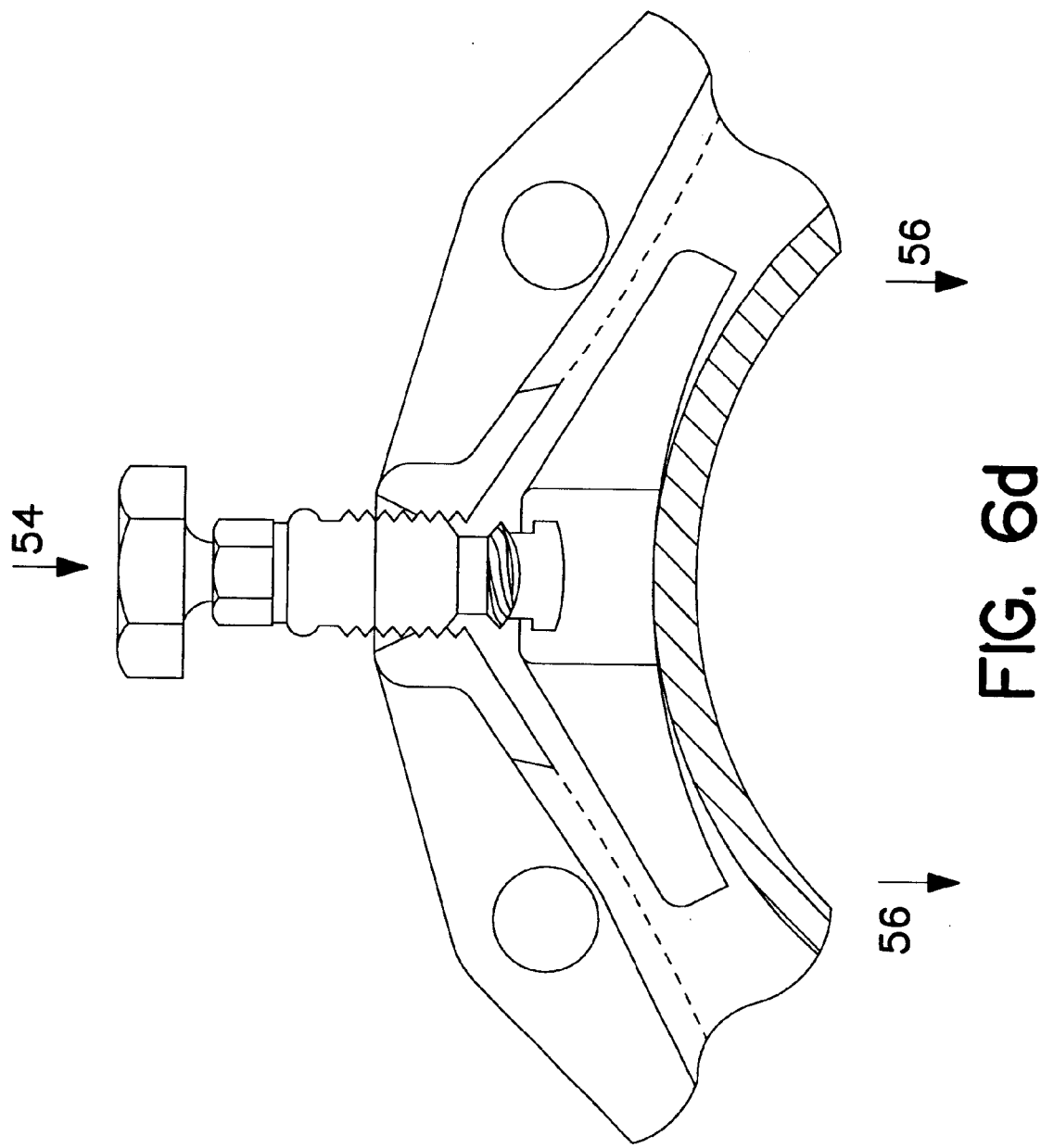

JOINT RESTRAINT ASSEMBLY

TECHNICAL FIELD

The present invention relates to a joint restraint assembly. More particularly, the present invention relates to a joint restraint assembly for connecting pipe.

BACKGROUND ART

Several types of joint restraint assemblies are known in the art. An example of a conventional type of restraint assembly comprises a substantially annular body having a plurality of internally threaded bores. Each bore radially extends from the body and is disposed in spaced relation to one another. A bolt is configured to extend through each bore. The end of each bolt typically includes a tongue or flange either integrally formed or affixed thereto designed to attach to a segment. The head of each bolt typically includes a torque head that is designed to sever when a predefined amount of torque is applied to the bolt.

To assemble the restraint, each bolt extends through the annular body until the tongue is exposed at the opposite end. The segment is configured with a slot, and is connected to the end of the bolt by laterally sliding the slot onto the tongue. The bolt is then partially retracted through the bore thereby withdrawing the segment into a pocket formed within the annular body. A stop ring is attached to the bolt at a predefined length on the bolt. The bolt is then extended back through the bore tightening the segment against the pipe up to the predefined length where the stop ring lies adjacent or abuts the bore. A wrench is commonly used to extend the bolt in the bore and tighten the torque head. Once the bolt tightens the segment sufficiently against the pipe, the torque head on the bolt severs. This insures that a consistent amount of torque is applied to each segment.

It would be advantageous for a restraint to require fewer assembly steps. As stated, this conventional restraint requires, among other things, to extend the bolt through the annular body, slide each segment onto each bolt, retract each bolt, and then attach each stop ring to the bolt. Refining these steps would obviously simplify the assembly process.

SUMMARY OF THE INVENTION

According to certain features, characteristics, embodiments and alternatives of the present invention which will become apparent as the description thereof proceeds below, the present invention provides a joint restraint assembly for connecting pipe. The assembly includes a substantially annular body configured to fit around a pipe, at least one pocket formed adjacent to the pipe, and at least one bore disposed through the body into said pocket. At least one segment is configured to fit in the pocket. At least one bolt includes an end and an integral stop ring, wherein the end extends through the bore and engages the segment, and the integral stop ring limits the extent to which the bolt can extend through the bore sufficient to retain the annular body around said pipe. The bolt may also include a threaded end, a threaded body, and a torque head attached opposite the end.

The annular body may also include a plurality of pockets circumferentially spaced about the body, as well as a plurality of bores, each one corresponding to one pocket. The assembly may include a plurality of segments respectively positioned within the pockets. In addition, the bolt extends through the bore engaging each segment.

The segment may include a slot configured to receive the threaded end of the bolt. The slot may include a pair of laterally spaced edges selectively cooperating with the threaded end allowing the end to be moveably fitted within the slot. The annular body may include an inner and outer periphery. Each pocket is formed in the inner periphery wherein the bore is disposed from said outer periphery into the pockets.

One embodiment of the present invention includes a method for restraining a pipe joint. The method includes providing a substantially annular body having at least one pocket facing a pipe joint opening and at least one bore disposed therethrough into said pocket; positioning at least one segment into the pocket; extending the pipe joint through the pipe joint opening such that the pipe joint is adjacent the pocket; providing at least one bolt having an end and an integral stop ring; and extending the bolt through the bore to cause the end to engage the segment to cause the segment to abut the pipe and the integral stop ring to abut the body.

Another embodiment of the present invention includes a method for assembling a joint restraint for use with a pipe. The method includes providing a substantially annular body having at least one pocket facing a pipe joint opening and at least one bore disposed therethrough into said pocket; positioning at least one segment into the pocket; extending a mandrel through the pipe joint opening such that the mandrel is adjacent the pocket; providing at least one bolt having an end and an integral stop ring; extending the bolt through the bore to cause the end to engage the segment to cause the segment to abut the mandrel such that the segment moves in concert with the bolt as the bolt is moved through the bore; and removing the mandrel from the pipe joint opening.

The method for assembling a joint restraint may also include extending a pipe through the pipe joint opening, and extending the bolt through the bore to cause the end to engage the segment to cause the segment to abut the pipe and the integral stop ring to abut the body. In addition, the method may include engaging a threaded end of the bolt with a pair of opposed edges of the segment, extending the bolt through the annular body and abutting the mandrel causing the segment to pivot and the opposed edges to angle coincident to the threaded end thereby coupling the bolt to the segment to cause the segment to move in concert with the bolt.

A further embodiment of the present invention includes a substantially annular body configured to fit around a pipe. The annular body has at least one pocket formed adjacent the pipe and at least one bore disposed through the body into said pocket. At least one segment is configured to fit in the pocket. And at least one bolt engages the segment such that the segment moves in concert with the bolt as the bolt is moved through the bore. This embodiment may also include a stop ring, an integral stop ring or a removable stop ring.

Additional features of the invention will become apparent to those skilled in the art upon consideration of the following detailed description exemplifying the best mode of carrying out the invention as presently perceived.

BRIEF DESCRIPTION OF THE DRAWINGS

The present invention will be described with reference to the attached drawings which are given as non-limiting examples only, in which:

FIG. 6a–e are several cross sectional views of the present invention taken along line A—A of FIG. 2 and positioned about a die.

Corresponding reference characters indicate corresponding parts throughout the figures. The exemplification set out herein illustrates a preferred embodiment of the invention, and such exemplification is not to be construed as limiting the scope of the invention in any manner.

DETAILED DESCRIPTION OF THE DRAWINGS

The present invention relates to a joint restraint assembly. More particularly, the present invention relates to a joint restraint assembly for connecting pipe. While the described embodiment is considered by the inventor to be the best mode of carrying out the invention, it should be understood that the claims presented below are not limited to the particular details of the described embodiment. Numerous variations may be readily apparent to those of skill in the art which would provide for construction of the joint restraint assembly cover which incorporates the principles of the present invention as claimed.

The joint restraint assembly of the present invention can be configured to fit pipes of any conventional size, and to join or attach to any other conventional restraint or gasket. The joint restraint assembly can also be made from any suitable material or combination of suitable materials. For example, such restraint assemblies, including the present invention, can be made from ductile iron.

Figure 1:
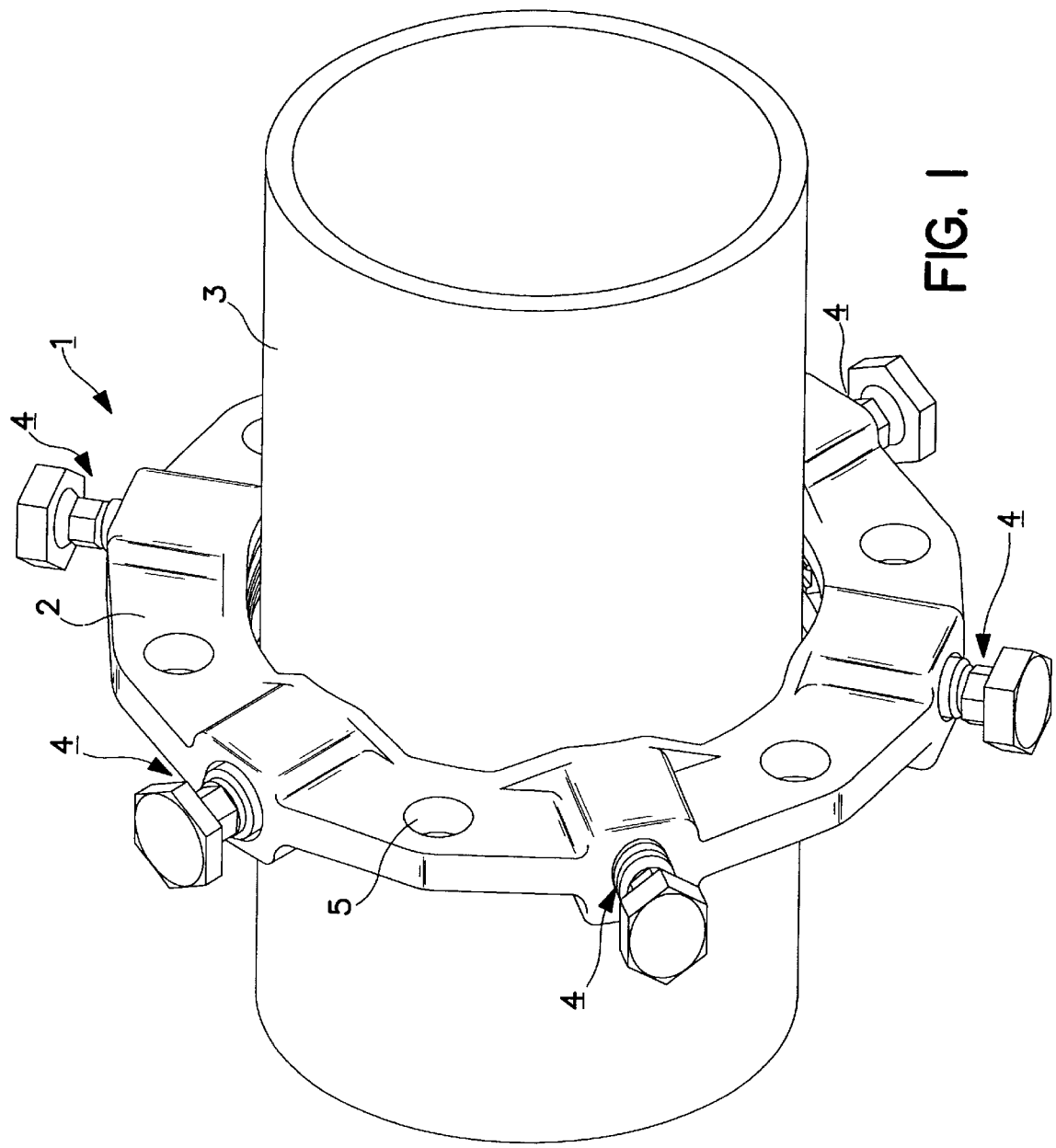
FIG. 1 is a perspective view of an installed joint restraint assembly embodying the present invention.
Figure 2:
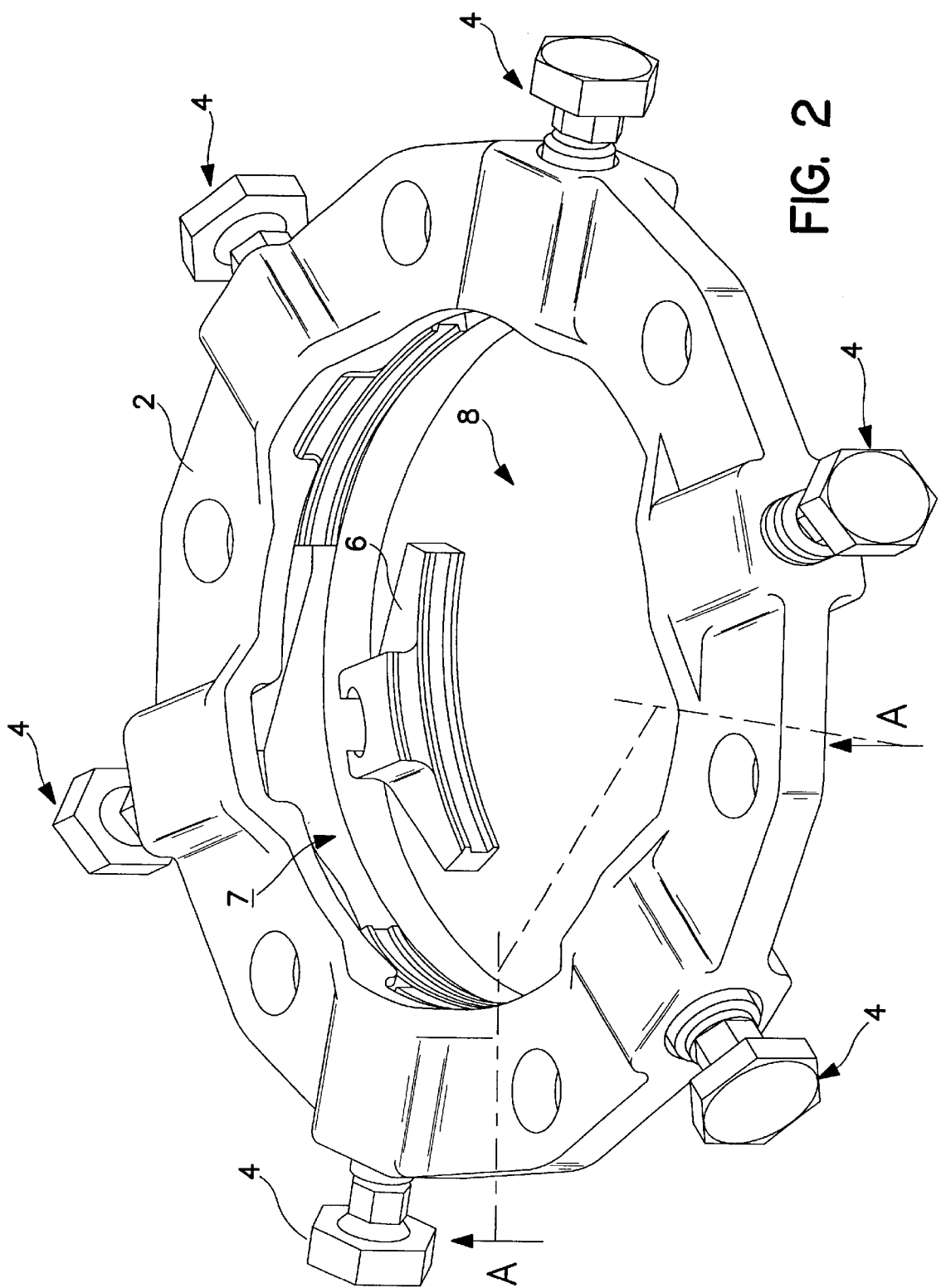
FIG. 2 is a perspective view of the joint restraint assembly embodying the present invention.

A perspective view of an installed joint restraint assembly 1 embodying the present invention is shown in FIG. 1. Joint restraint assembly 1 comprises a substantially annular body or gland 2, and bolts 4. As shown in FIG. 2, joint restraint assembly 1 also comprises several segments 6 each set in a hollow internal space or pocket 7. At least one bolt 4, often several, extends radially through gland 2. At least one segment 6, and often several, corresponding in number to that of bolts 4, is positioned between bolt 4 and pipe 3. By extending bolt 4 through gland 2 and engaging segment 6, a force is applied to segment 6 urging it against pipe 3 creating a gripping force that holds pipe 3 in place. It is appreciated that gland 2 can receive any number of bolts 4 and segments 6 sufficient to secure gland 2 onto pipe 3. In addition, as shown in FIGS. 1 and 2, if more than one bolt 4 and segment 6 are used, they may be disposed in a spaced relation with each other about gland 2.

Pipe 3 is inserted into the pipe joint opening 8 of gland 2. Illustratively, connecting apertures 5 are disposed through gland 2 generally parallel to the longitudinal axis of pipe 3. Aperture 5 can be configured to receive a bolt (not shown) from another gland (not shown) that is attached to another pipe (not shown), thereby connecting the two pipes.

Figure 3:
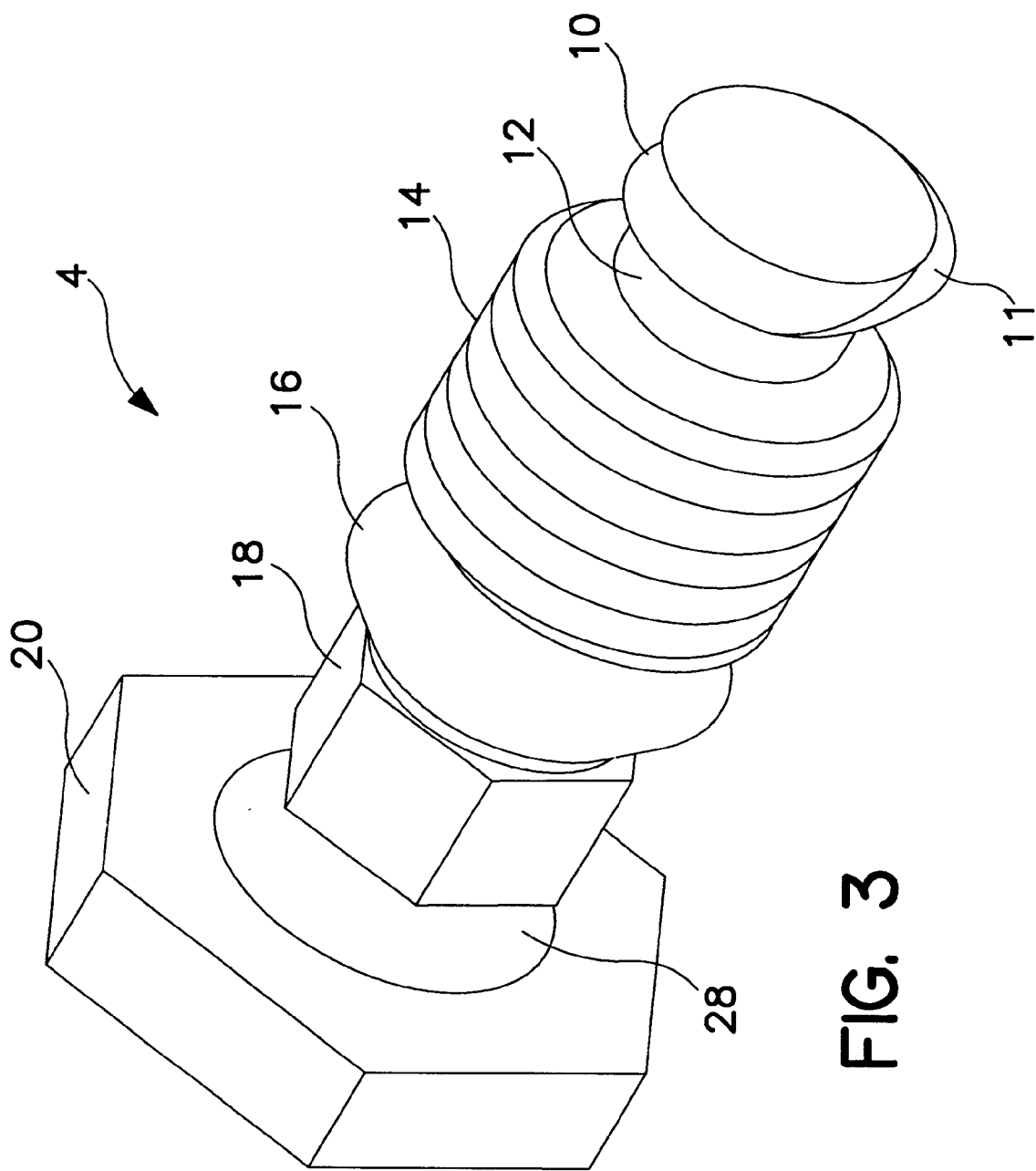
FIG. 3 is a perspective view of a bolt from the present invention.

A perspective view of bolt 4 is shown in FIG. 3. Bolt 4 is used to abut segment 6 against pipe 3. In addition, bolt 4 provides the requisite force against segment 6 to hold assembly 1 onto pipe 3. Illustratively, bolt 4 comprises a threaded end 10, a shank 12 coaxially formed from threaded end 10, a threaded body 14 coaxially formed from shank 12, a stop ring 16 coaxially formed from threaded body 14, a hex-head 18 coaxially formed from stop ring 16 and a torque head 20 coaxially formed from hex-head 18 at neck 28. It is appreciated that various configurations and combinations of some or all of these components may comprise bolt 4.

In one embodiment, threaded end 10 is sized and configured to connect to segment 6 while it is positioned in pocket 7. (See FIGS. 5 and 6a–6e.) Threaded end 10 illustratively comprises about two threads 11 making this portion of bolt 4 wider than shank 12. As will be discussed in greater detail below, this configuration allows threaded end 10 to be fitted within slot 22 of segment 6, as shown in FIGS. 6d and 6e. It is appreciated, however, that any suitable means, in place of threaded end 10 that can connect bolt 4 to segment 6 as described herein, will be adequate.

Threaded body 14 is formed on bolt 4 between shank 12 and stop ring 16. Threaded body 14 is configured to engage corresponding threads formed in bore 24 (forming threaded bore 24) of gland 2. Body 14 is of sufficient length to allow threaded end 10 to connect to segment 6 and exert a force on segment 6 against pipe 3 as it is being extended through threaded bore 24. (See FIG. 6c.) It is appreciated that body 14 may be configured in any suitable method, with any type of thread, or any alternative to being threaded, that can still serve the functions described herein.

Stop ring 16 is illustratively formed between threaded body 14 and hex-head 18 on bolt 4, and has a wider diameter than threaded body 14. Stop ring 16 limits the length to which bolt 4 can extend through bore 24. Stop ring 16 can be integrally formed, fused or otherwise permanently attached to bolt 4. It is appreciated that ring 16 may be of any general shape or configuration that will sufficiently limit the distance bolt 4 can extend through bore 24. In addition, because of how threaded end 10 engages segment 6 as described herein, stop ring 16 may be removably attached.

Torque head 20 is an illustratively hexagonal bolt head coaxially attached to hex-head 18 at neck 28. The hexagonal shape is a conventional configuration for use with a wrench (not shown) or any other grippable member that can apply a turn or twist to threaded body 14 thereby extending same through bore 24. It is appreciated, however, other configurations in place of torque head 20 may be used. For example, a slot sized to receive a conventional screw driver may be used in place of the hexagonally shaped head.

Hex-head 18, like torque head 20, is configured to assist in tightening or loosening bolt 4 by means of a wrench. As stated, hex-head 18 is attached to torque head 20 via neck 28. When torque head 20 is severed as discussed herein, hex-head 18 becomes available to tighten bolt 4, or, loosen same if assembly 1 needs to be moved or replaced. As previously discussed with regard to torque head 20, hex-head 18 may be configured as to receive any conventional wrench, screw driver or other device that can apply a turn or twist to threaded body 14 thereby extending same through bore 24.

Figure 4:
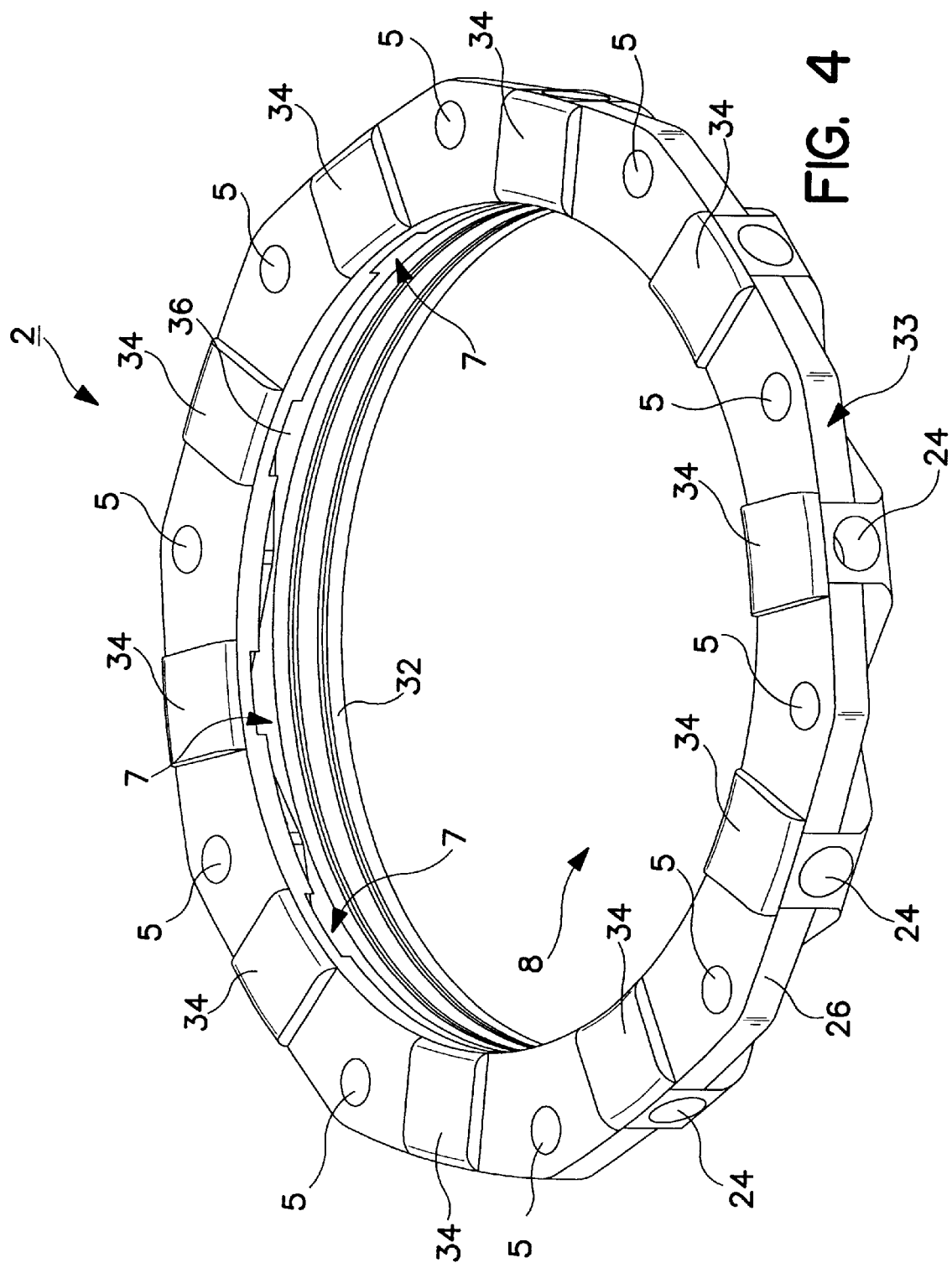
FIG. 4 is a perspective view of an annular body from the present invention.

A perspective view of gland 2 is shown in FIG. 4. As previously discussed, annular body 2 is fitted about pipe 3 through pipe joint opening 8 which is defined by inner periphery 32. (See also FIG. 1.) Illustratively, several reinforcing blocks 34 are formed between inner and outer peripheries 32 and 33, respectively, to add strength to gland 2. Reinforcing blocks 34 are positioned in spaced relation with each other about gland 2. Each reinforcing block 34 also includes a threaded bore 24 and pocket 7, as shown in FIGS. 2 and 4. Illustratively, bore 24 is disposed through outer periphery 33 into pocket 7. Also previously discussed, gland 2 is the structure that attaches to another gland to join at least two pipes together.

Figure 5:
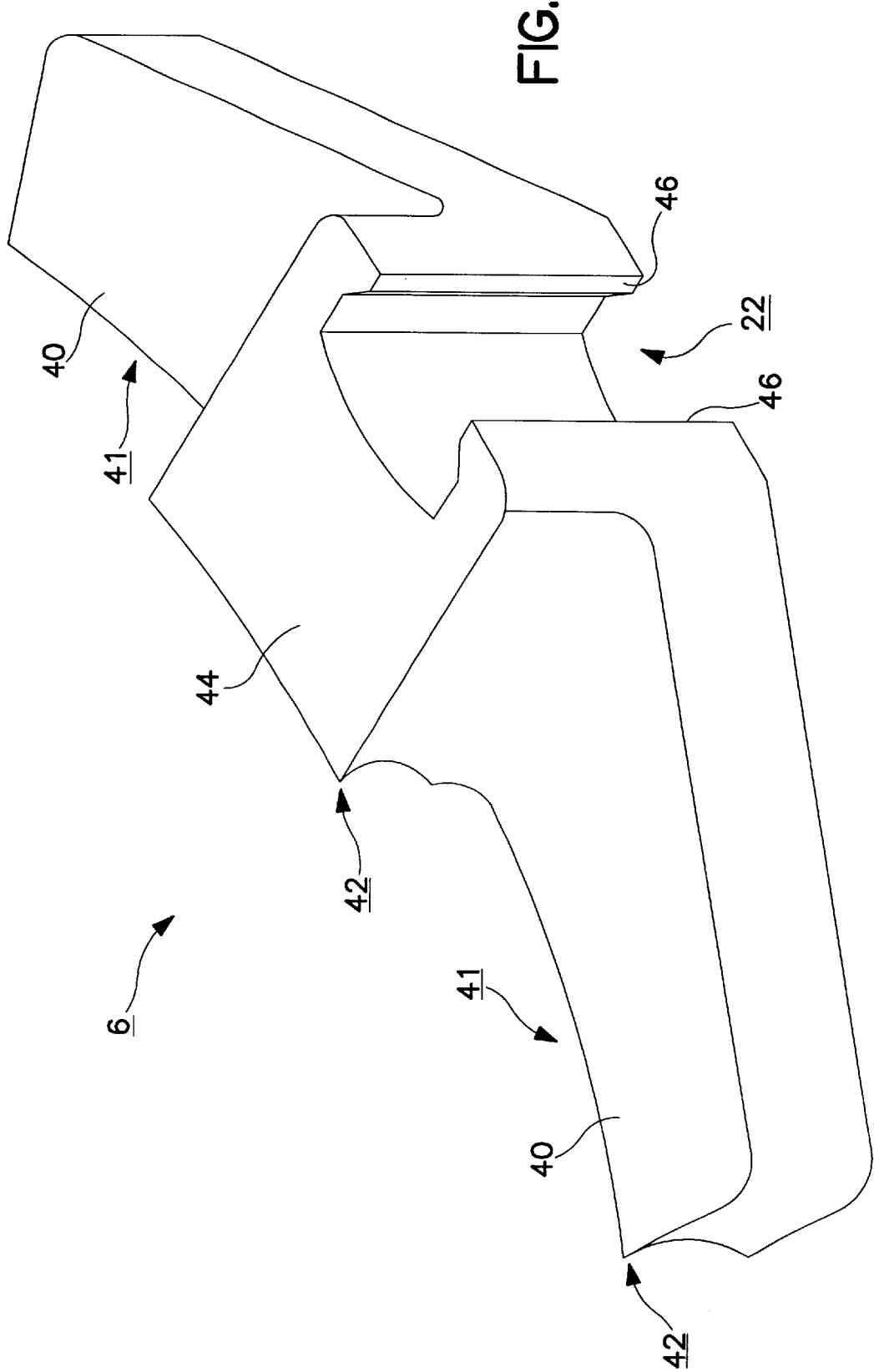
FIG. 5 is a perspective view of a segment from the present invention.
Figure 6A:
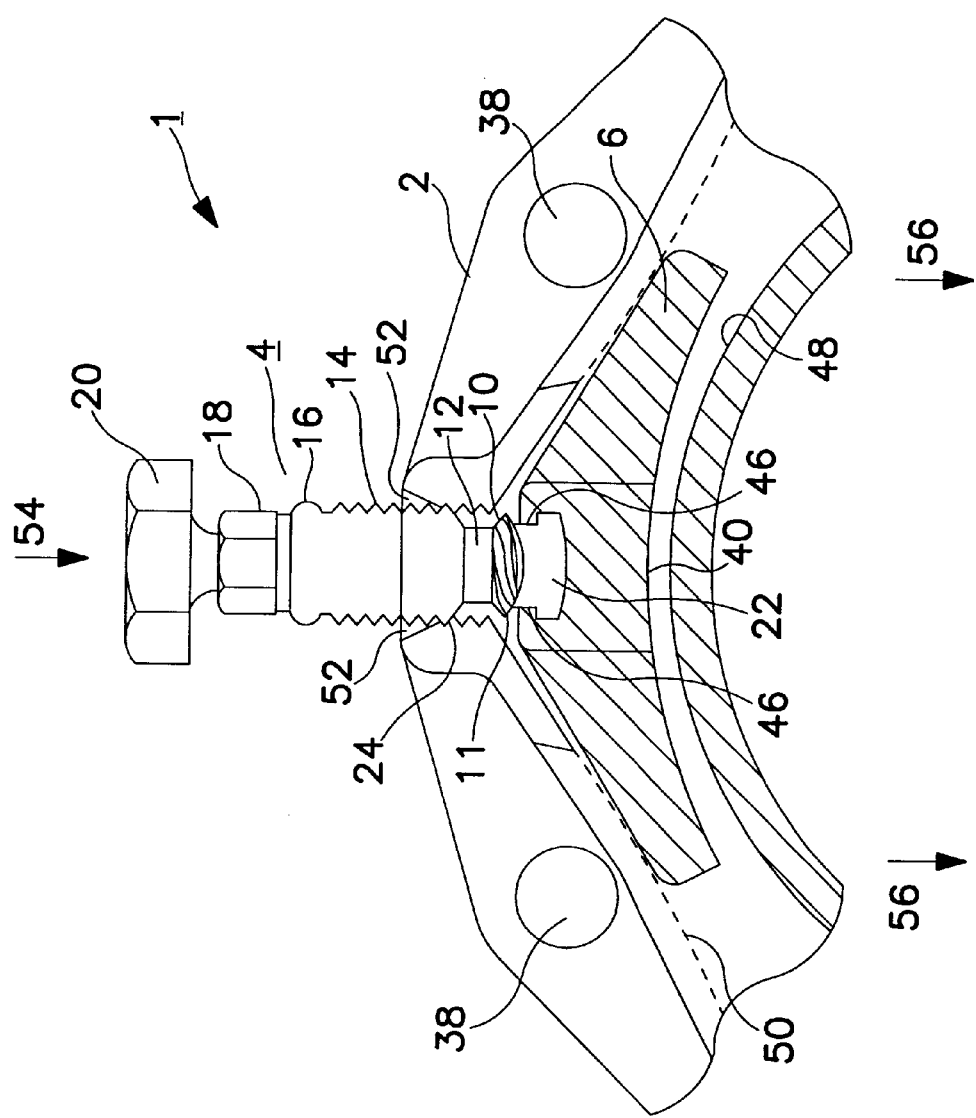

A perspective view of segment 6 is shown in FIG. 5. Again, segment 6 is the structure that connects to threaded end 10 of bolt 4 inside pocket 7 securing assembly 1 to pipe 3. In one embodiment, segment 6 comprises an extended base 40 having a generally curved radius 41 along its longitudinal extent. Illustratively, radius of curvature 41 approximates the radius of curvature of pipe 3. Gripping teeth 42 can be formed on extended base 40 to assist gripping pipe 3. Two such teeth 42 are illustratively shown at the edge of base 40. Each tooth 42, can extend the length of base 40 as shown in FIG. 5. It is appreciated, however, that one tooth, several teeth, or even no teeth can be used in this invention. In addition, the tooth or teeth may be oriented in any suitable direction or may have any configuration that assists in securing assembly 1 to pipe 3.

Segment 6 also illustratively comprises a reinforcing body 44 formed about midway along base 40. It is appreciated that in an alternative embodiment segment 6 may comprise body 44 without base 40. Body 44 can also have a tooth 42, like those previously discussed, formed at its lower most extent. Illustratively, opposite base 40 is slot 22. Slot 22 is illustratively defined by an opening having two lateral edges 46. Edges 46 serve as the cooperating threads that engage threads 11. (See FIGS. 6c and 6d.) It is appreciated that slot 22 can be configured and oriented anywhere on segment 6 in relation to base 40 that allows segment 6 to connect to bolt 4.

Figure 6C:
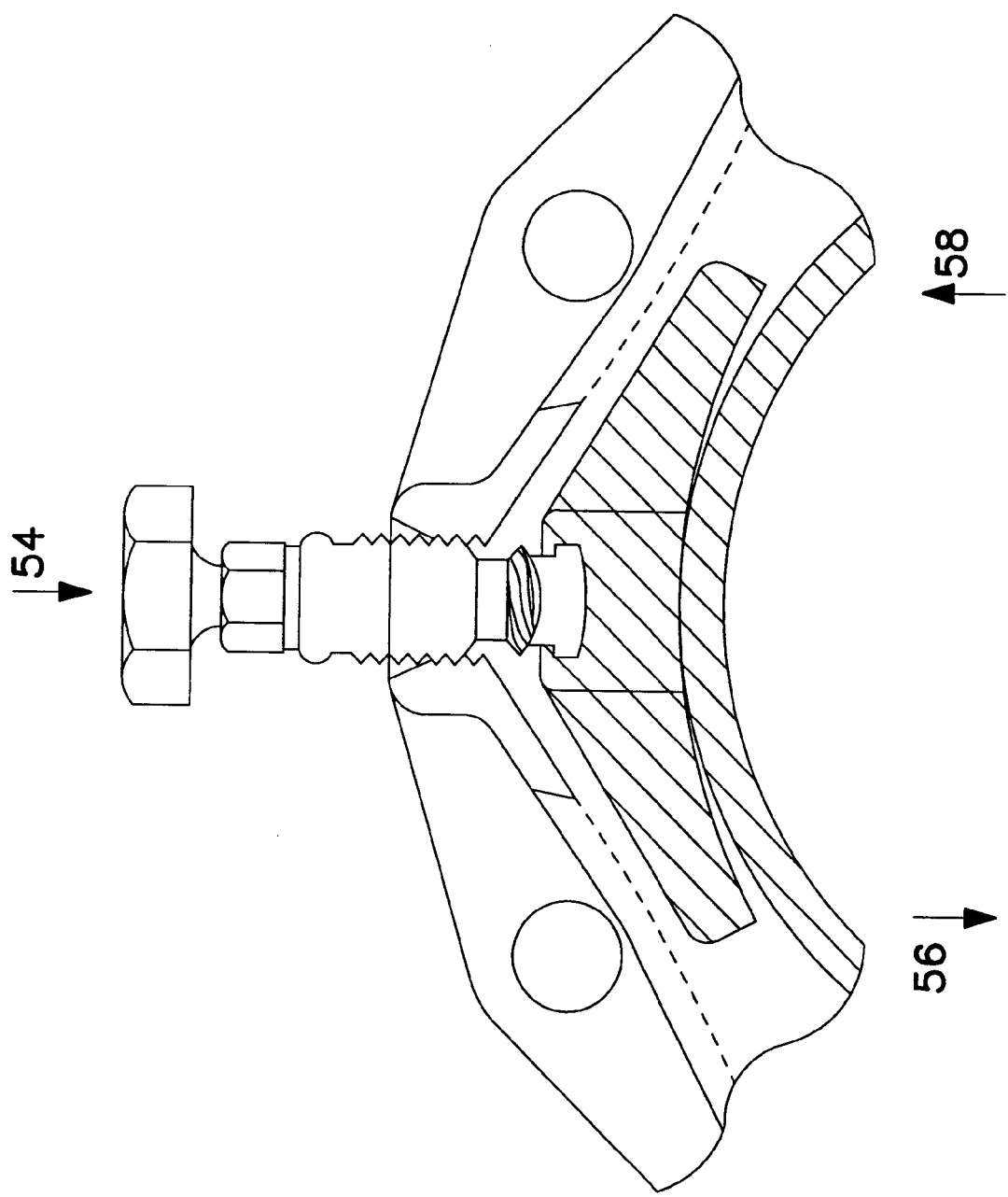
Figure 6E:
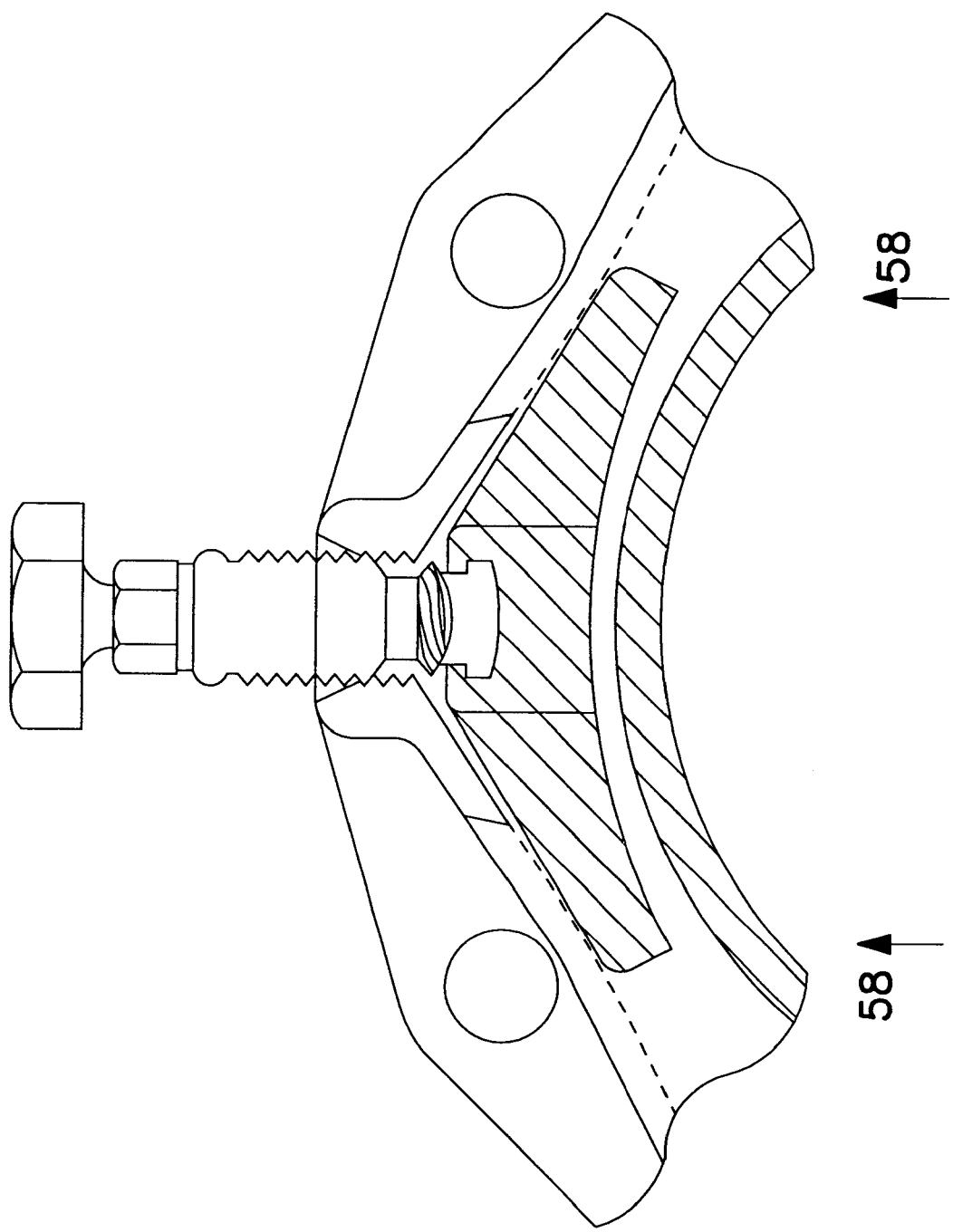
Figure 6E:
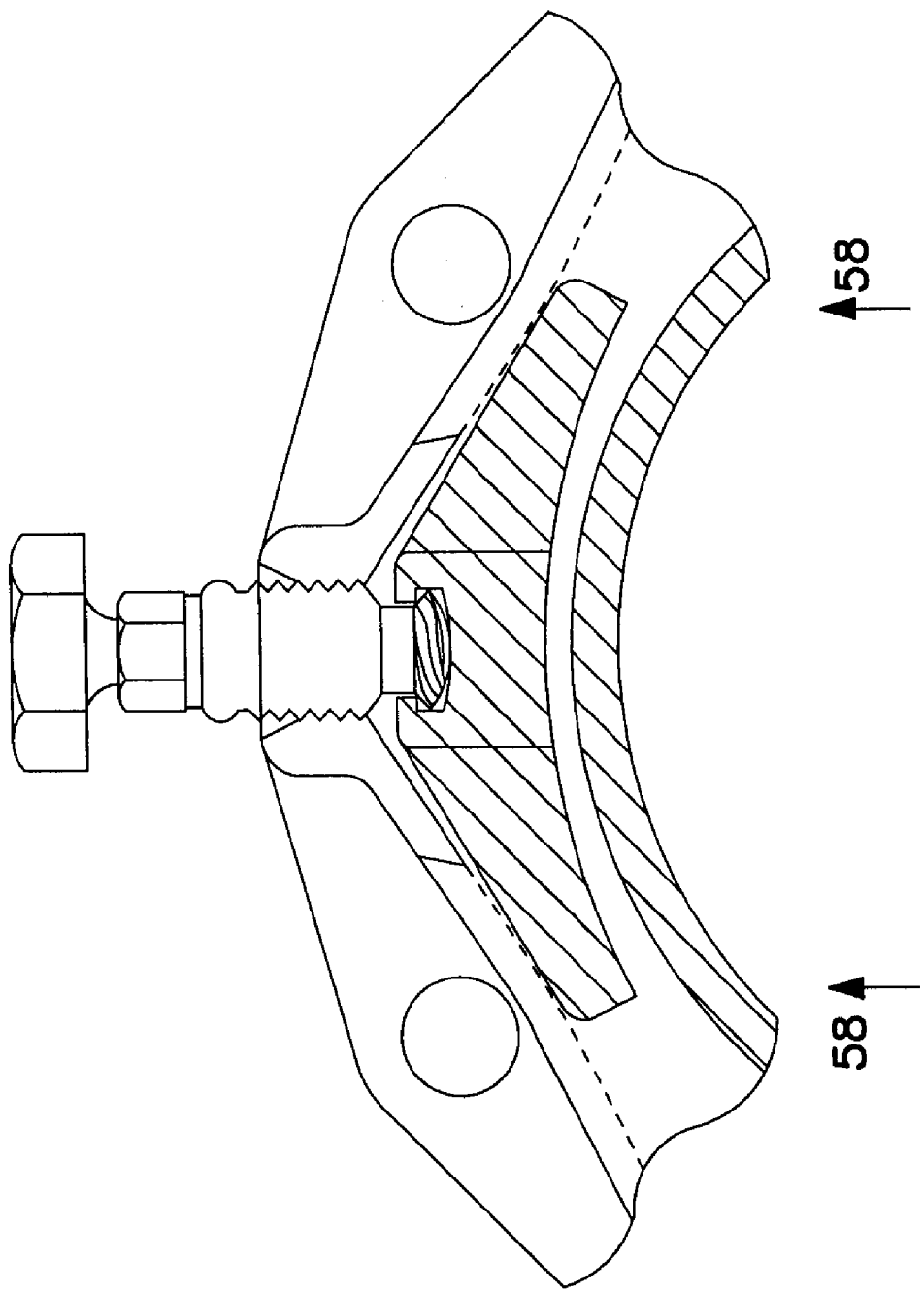

A cross-sectional view of joint assembly 1 showing the sequential method of its assembly is shown in FIGS. 6a–6e. The first step in this method is to position segment 6 into pocket 7 with slot 22 facing bore 24. In one illustrative embodiment, assembly 1 is placed about a mandrel 48 for preassembly of bolt 4 and segment 6. Mandrel 48 is used because it is a convenient way to preassemble the assembly before it is taken into the field for use on the actual pipe. Illustratively, mandrel 48 is generally the shape and size of a diameter of actual pipe. It is appreciated, however, that mandrel 48 may be of any suitable shape and sized to assist in assembling assembly 1. Once assembly 1 has been placed around mandrel 48, threaded body 14 is extended or rotated into threaded bore 24 in the direction of arrow 54, as shown in FIG. 6a. Bolt 4 is further extended through bore 24 until end 10 contacts laterally spaced edges 46. As bolt 4 further extends through bore 24, segment 6 is nudged toward mandrel 48 as shown by directional arrows 56. (See FIG. 6b.) The inherent angle of threads 11 of end 10, and mandrel 48 acting as a fulcrum, causes segment 6 to pivot in directions 56 and 58, respectively, as shown in FIG. 6c. Pocket 7 is sized to allow segment 6 to pivot as it abuts mandrel 48. Edges 46 pivot to form a complementary angle to threads 11. At this angle, threads 11 can engage edges 46 allowing end 10 to screw into slot 22, as shown in FIG. 6d. End 10 is received in slot 22 until edges 46 reach the end of threads 11. Edges 46 will now be adjacent shank 12 and end 10 will be free to rotate as it is contained in slot 22. Once threaded end 10 is rotatably contained to segment 6, bolt 4 is then partially retracted (or unscrewed) through bore 24. Because segment 6 now has no fulcrum to pivot against, edges 46 will not pivot to the same angle as threads 11. This prevents threaded end 10 from engaging and thereby disconnecting from slot 22. Threaded end 10 will simply rotate within slot 22 as bolt 4 is unscrewed. Bolt 4 is retracted until segment 6 abuts innermost wall 50, as shown in FIG. 6e. Assembly 1 is then ready to be removed from mandrel 48 and be delivered to the site where it can be installed onto pipe 3, as previously shown in FIG. 1.

As previously discussed, pipe 3 is extended through pipe joint opening 8. Each bolt 4 is then tightened by rotating it in a manner described herein until torque head 20 is caused to sever or break off at neck 28. Neck 28 is illustratively narrower than either torque head 20 or hex-head 18. Neck 28 is configured to accept a certain amount of torque before it will fail. The amount of torque is determined by the amount of force that is desired to place against segment 6.

Although the present invention has been described with reference to a particular means, material and embodiment, from the foregoing description one skilled in the art can easily ascertain the essential characteristics of the present invention and various changes and modifications may be made to adapt the various uses and characteristics without departing from the spirit and scope of the present invention as set forth in the following claims.

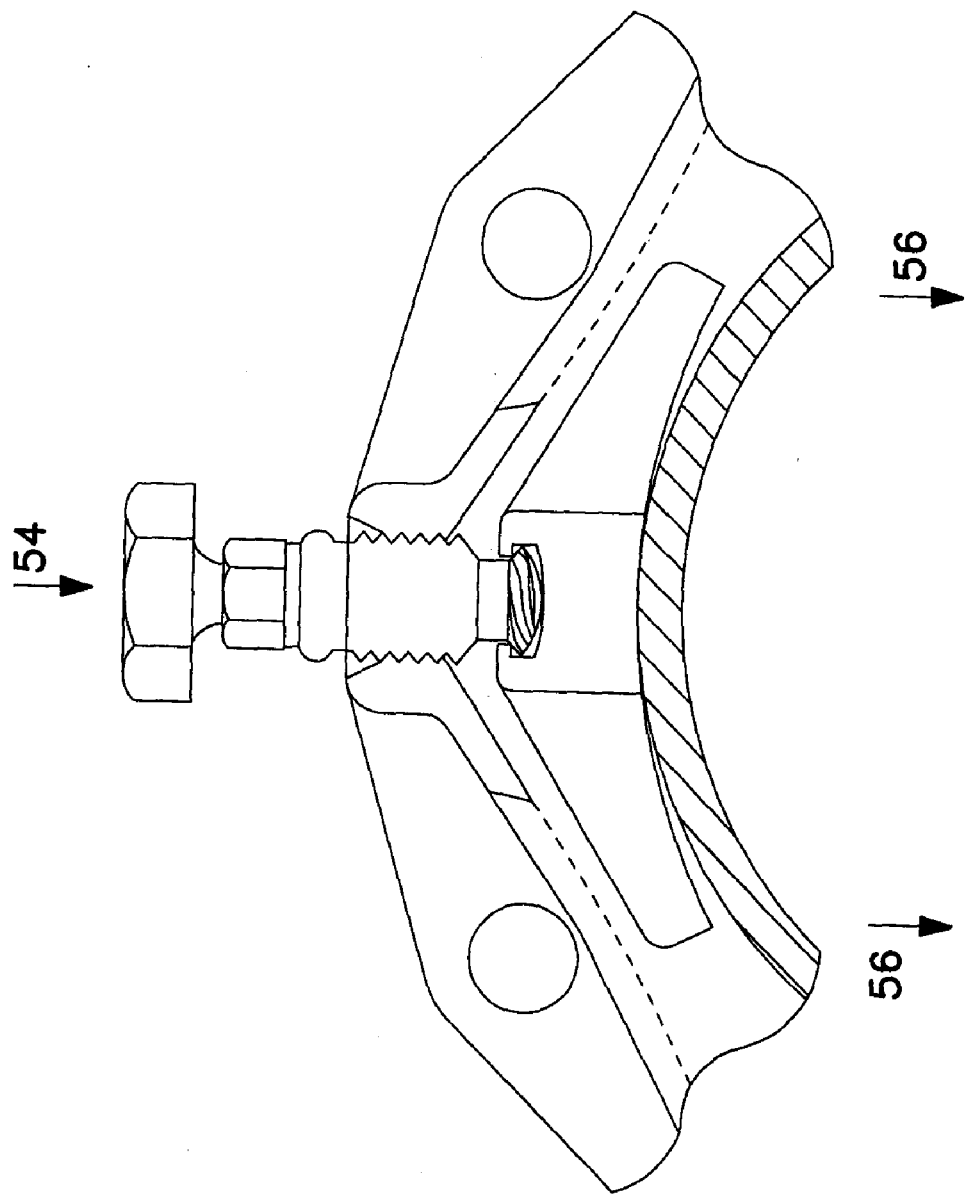

What is claimed is:

1. A joint restraint assembly for coupling a pipe to another structure by gripping the outside surface of the pipe, the joint restraint assembly comprising:
   a substantially annular body configured to fit around the pipe, said annular body having at least one pocket to beb formed adjacent the pipe, and at least one bore disposed through the body into said pocket;
   at least one segment configured to be positioned within the pocket, the segment having an opening;
   at least one bolt having a threaded end, the threaded end extending through the bore and threading into the segment to carry the segment; and
   the opening having a pair of laterally spaced edges selectively cooperating with the threaded end for allowing the threaded end to be moveably fitted within the opening.

2. The joint restraint assembly of claim 1, wherein the bolt further comprises a stop ring.

3. The joint restraint assembly of claim 2, wherein the stop ring is an integral stop ring.

4. The joint restraint assembly of claim 2, wherein the stop ring is a removable stop ring.

5. The joint restraint assembly of claim 2, wherein said bolt further comprises a threaded body formed between the ring and the threaded end, and wherein the bore extending through the annular body has threads configured to receive the threaded body.

6. The joint restraint assembly of claim 1, wherein said at least one pocket is a plurality of pockets circumferentially spaced about the body, and wherein said at least one bore is a plurality of bores also positioned circumferentially about the body, each of said bores are disposed into each of said pockets, and wherein said at least one segment is a plurality of segments each positioned within one of said pockets, and wherein each said bolt extends through one of said bores engaging one of said segments.

7. The joint restraint assembly of claim 1, wherein said bolt further comprises a torque head attached opposite the end.

8. The joint restraint assembly of claim 1, wherein the substantially annular body further comprises an inner and outer periphery, such that the pocket is formed in the inner periphery and the bore is disposed from said outer periphery into the pocket.

* * * * *

UNITED STATES PATENT AND TRADEMARK OFFICE
CERTIFICATE OF CORRECTION

PATENT NO.      : 6,322,273 B1
DATED           : November 27, 2001
INVENTOR(S)     : Zachary J. Gentile, Jr.

It is certified that error appears in the above-identified patent and that said Letters Patent is hereby corrected as shown below:

<u>Drawings,</u>
Sheet 9, Fig. 6d, the threaded end 10 of bolt 4 should be located in slot 22 of segment 6. Attached herewith is a substitute Sheet 9, Fig. 6d, showing the correct placement of threaded end 10 of bolt 4 relative to slot 22 of segment 6.
Sheet 10, Fig. 6e, the threaded end 10 of bolt 4 should be located in slot 22 of segment 6. Attached herewith is a substitute Sheet 10, Fig. 6e, showing the correct placement of threaded end 10 of bolt 4 relative to slot 22 of segment 6.

Signed and Sealed this

Fourteenth Day of October, 2003

JAMES E. ROGAN
*Director of the United States Patent and Trademark Office*